US011868789B2

United States Patent
Kokku et al.

(10) Patent No.: US 11,868,789 B2
(45) Date of Patent: Jan. 9, 2024

(54) GENERATING COMPOUND ACTION LINKS IN A MULTI-MODAL NETWORKED ENVIRONMENT

(71) Applicant: Merlyn Mind, Inc., New York, NY (US)

(72) Inventors: Ravindranath Kokku, Yorktown Heights, NY (US); Aditya Vempaty, Yorktown Heights, NY (US); Sharad Sundararajan, Union City, NJ (US); Satya V. Nitta, Cross River, NY (US); Latha Ramanan, Menlo Park, CA (US); Juan Ernesto Penarrieta Cornejo, Washington, WA (US); Rajkumar Chandrasekaran, San Ramon, CA (US); Helene Alonso, New York, NY (US); Paul V. Haley, Sewickley, PA (US); Tamer Abuelsaad, Fishkill, NY (US); Prasenjit Dey, Kolkata (IN)

(73) Assignee: Merlyn Mind, Inc., New York, NY (US)

( * ) Notice: Subject to any disclaimer, the term of this patent is extended or adjusted under 35 U.S.C. 154(b) by 0 days.

(21) Appl. No.: 17/537,956

(22) Filed: Nov. 30, 2021

(65) Prior Publication Data

US 2023/0069549 A1    Mar. 2, 2023

(30) Foreign Application Priority Data

Aug. 26, 2021  (IN) .............................. 202141038743

(51) Int. Cl.
  *G06F 9/451* (2018.01)
  *G06F 3/16* (2006.01)
  *G06F 3/04842* (2022.01)

(52) U.S. Cl.
  CPC .............. *G06F 9/451* (2018.02); *G06F 3/167* (2013.01); *G06F 3/04842* (2013.01)

(58) Field of Classification Search
  CPC ....... G06F 9/451; G06F 3/167; G06F 3/04842
  See application file for complete search history.

(56) References Cited

U.S. PATENT DOCUMENTS

| | | | |
|---|---|---|---|
| 2003/0103088 A1* | 6/2003 | Dresti | G06F 3/0484 715/835 |
| 2006/0026572 A1* | 2/2006 | Srivastava | G06F 9/45512 717/136 |
| 2008/0294986 A1* | 11/2008 | Seo | G06F 9/45512 715/704 |
| 2016/0034238 A1* | 2/2016 | Gerlach | G06F 3/1423 345/1.1 |
| 2017/0345426 A1* | 11/2017 | Komissarchik | G10L 15/07 |
| 2019/0187987 A1* | 6/2019 | Fauchère | G06F 9/45512 |
| 2022/0291932 A1* | 9/2022 | Nouri | G06F 3/167 |

* cited by examiner

*Primary Examiner* — Sang H Kim
(74) *Attorney, Agent, or Firm* — Duane Morris LLP (57) ABSTRACT

A data management server computer ("server") is disclosed. The server receives action data associated with one or more users identifying a plurality of actions performed through one or more computer devices in a multi-modal networked environment, identifies useful sequences of actions as compound actions, and generates deep links representing the compound actions as UI elements which when invoked cause execution of the represented compound actions.

20 Claims, 7 Drawing Sheets

GENERATING COMPOUND ACTION LINKS IN A MULTI-MODAL NETWORKED ENVIRONMENT

RELATED APPLICATION

This application claims priority under 35 U.S.C. 119(a)-(d) to Foreign Application No. 202141038743 entitled "GENERATING COMPOUND ACTION LINKS IN A MULTI-MODAL NETWORKED ENVIRONMENT" and filed in India on Aug. 26, 2021, the contents of which are herein incorporated in their entirety by reference for all purposes.

FIELD OF THE DISCLOSURE

One technical field of the present disclosure is identification of compound actions comprising digital actions to facilitate user control of computer devices in a multi-modal networked environment. Another technical field is generation of user interface for easy instruction of performance of compound actions.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Conventional macroinstructions in computing allow a long sequence of user commands to be mapped to a single action. Such macroinstructions can be executed via a click of a mouse, a selection of a key combination on a keyboard, or a selection of a selectable option on a user interface. Conventional macroinstructions help simplify operating tasks on a computing device, thereby improving the operation of computing devices.

Sometimes, only sophisticated users of computing devices are capable of programming macroinstructions. For example, a programmer may be able to create a set of macroinstructions for cleaning up code, but a modern user of a computing device would not know how to build macroinstructions relevant to individual needs.

In addition, if macroinstructions are automatically generated for every repeatable sequence of user commands, the inability of a user to memorize every single set of inputs to execute or use these sequences of commands would remove the effectiveness of these sequences of commands.

Furthermore, macroinstructions tend to comprise either all application-specific user commands or all application-agnostic user commands but not a mix of them. An application-specific set of macroinstructions may be useful only to those who are operating a specific application. An application-agnostic set of macroinstructions may perform general operations, such as clicking and typing, but are less useful for performing specific tasks which may be performed differently in different applications or on different websites.

As noted above, conventional macroinstructions are associated with certain challenges. In a multi-modal networked environment, where multiple computer devices, including input and output (I/O) devices, communicate with one another, effectively mapping a long sequence of user commands and corresponding digital actions to a single compound action can be an even more difficult task.

It would be helpful to have a system which can automatically generate sets of UI elements, each representing a single action mapped from a long sequence of digital actions taken in a multi-modal networked environment, and enable these UI elements to be easily accessible to a user.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:
1. GENERAL OVERVIEW
2. EXAMPLE COMPUTING ENVIRONMENT
3. EXAMPLE COMPUTER COMPONENTS
4. FUNCTIONAL DESCRIPTIONS
   4.1. FUNCTIONAL OVERVIEW
   4.2. COMPOUND ACTION IDENTIFICATION
      4.2.1. TEMPORAL GROUPINGS
      4.2.2. FREQUENCY FILTERING
      4.2.3. SELECTION OF SEQUENCES OF ACTIONS
      4.2.4. IDENTIFICATION OF COMPOUND ACTIONS FOR DEEP LINKS
5. COMPOUND ACTION INTERFACES
6. HARDWARE IMPLEMENTATION

1. General Overview

A data management server computer ("server") and related methods are disclosed to determine compound actions each corresponding to a sequence of digital actions ("actions") and generate corresponding deep links for execution by one or more computer devices in a multi-modal networked environment. In an embodiment, the server tracks actions performed on various computer devices, including input/output (I/O) devices or computing devices with a digital communication interface. The server identifies sequences of actions from the tracked actions and determines a frequency of performance of each of the sequences of actions. Based on the frequency, the length (number of constituent actions), the total number of desired compound actions, or other factors, the server selects sequences of actions to be turned into compound actions. For each compound action, the server then generates a deep link in the form of an UI element that is associated with instructions which, when executed, cause performance of the sequence of actions of the compound action. The server provides data related to the deep link to a client device which can cause presentation of the deep link for user access.

For example, a long sequence of user commands ("commands") or operations in the multi-modal networked environment could comprise:
1. Wake up a laptop.
2. Switch the display interface to a projector.
3. Open a video on the laptop.
4. Play the video on the laptop, with the video displayed by the projector.
6. Instruct the laptop to display the video in full screen.

Each of these commands received by input devices would be interpreted to derive a corresponding action that can be performed by a computer device, which could be a processor or an I/O device with a digital communication interface. This long sequence of commands above involves digital actions performed using a computer, a laptop, and a projector.

In some embodiments, the deep link as a shortcut is represented as a voice command as a string of text to be uttered by a user. The server may generate the shortcut by initially determining an intent of the commands leads to the compound action. Based on the intent, the server may select generate candidate voice commands and a plurality of alternative voice commands with appropriate alternative words or phrases. The server may then select one of the candidate voice commands as a representation of the deep link by comparing the candidate voice commands with the plurality of alternative voice commands.

The data management server offers many technical benefits. The server enables faster and more effective usage of different computer devices, which include I/O devices or computer devices that can interact with the server through automatic identification of compound actions and generation of deep links. The automated aspect of the compound actions allows users to have access to compound actions by automatically identifying long sequences of actions that are often used or more useful to users, which increases the efficiency with which the computer devices can be operated in a multi-modal networked environment. The deep links improve user interactions with computer devices in the multi-modal networked environment by turning compound actions into deep links that could be quickly accessed and executed by users, which then cause performance of the compound actions. The deep links, once selected, shorten the execution time of a compound action by automatically executing the corresponding sequence of actions that would have been separately and manually executed by users. Additionally, the generation of voice commands to represent deep links provides an alternative way for users to invoke compound actions besides icons on a screen to be clicked on, for example. The generation of voice commands enables improvements in audio processing by decreasing the error rate of a computer device receiving other user utterances which are phonetically similar to the voice commands.

2. Example Computing Environment

Figure 1:
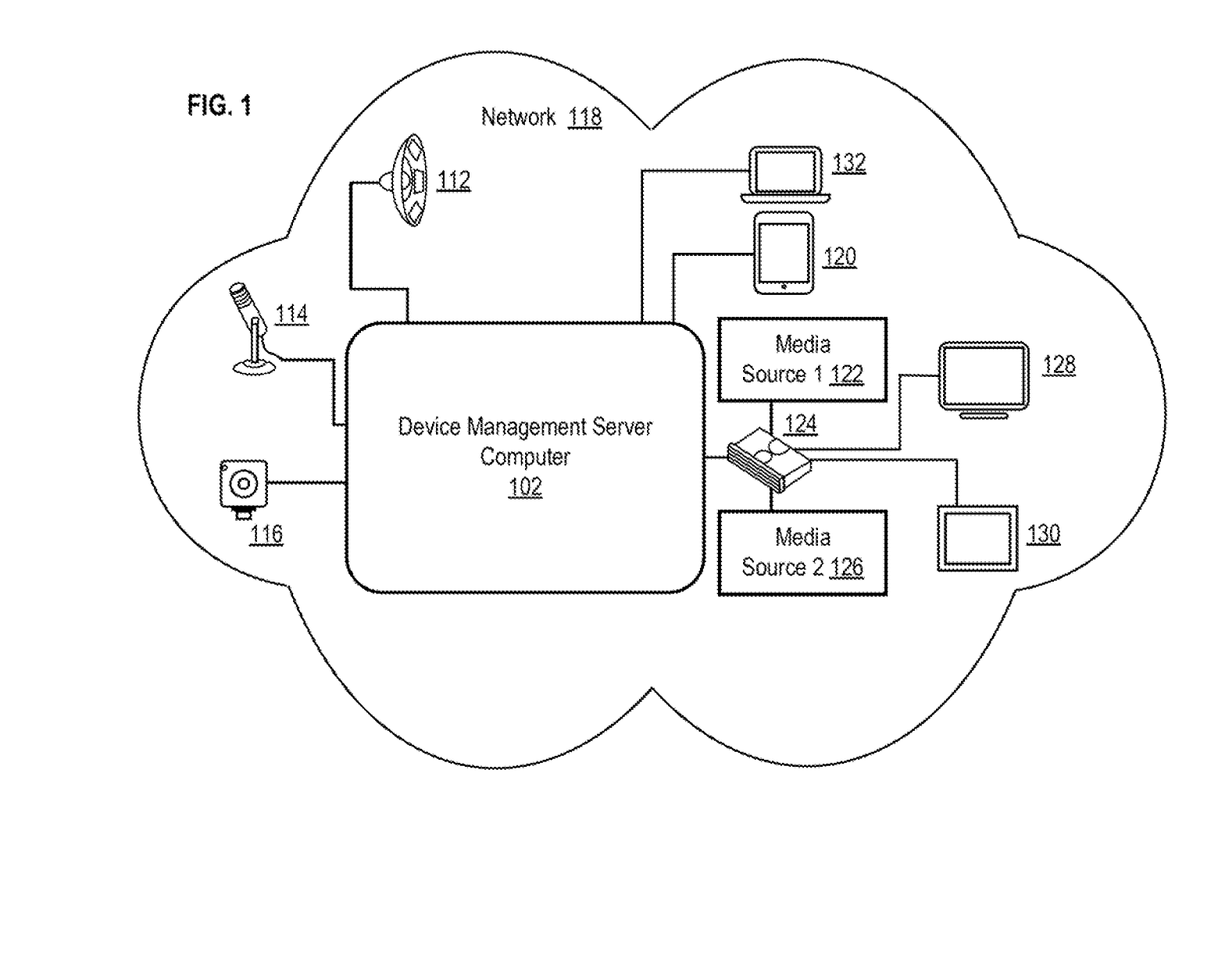
FIG. 1 illustrates an example networked computer system in which various embodiments may be practiced.

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, the networked computer system comprises a device management server computer 102 ("server") and an I/O system, including one or more integrated devices 132 and 120 which integrate input and output capabilities, a media switch 124, one or more input devices 114, 116, 122, and 126, and one or more output devices 112, 128, and 130. The server can be communicatively coupled with each component of the I/O system via one or more networks 118 or cables, wires, or other physical components.

In some embodiments, the server 102 broadly represents one or more computers, virtual computing instances, and/or instances of a server-based application that is programmed or configured with data structures and/or database records that are arranged to host or execute functions including but not limited to managing the I/O system, collecting action data, identifying compound actions, generating user interfaces for executing the compound actions, providing the user interfaces to a client device and/or causing execution of a compound action on one or more computer devices. In certain embodiments, the server 102 can comprise a controller that provides a hardware interface for one or more components in the I/O system. For example, the server 102 can have an audio controller that communicates with I/O devices that handle audio data or a camera controller that specifically communicates with a camera. The server 102 is generally located in a physical room with the I/O system to help achieve real-time response.

In some embodiments, the I/O system can comprise any number of input devices, output devices, or media switches. An input device typically includes a sensor to receive data, such as a keyboard to receive tactile signals, a camera to receive visual signals, or a microphone to receive auditory signals. Generally, there can be a sensor to capture or measure any physical attribute of any portion of the physical room. Additional examples of a physical attribute include smell, temperature, or pressure. There can also be sensors to receive external signals, such as a navigation device to receive satellite GPS signals, a radio antenna to receive radio signals, or a set-top box to receive television signals. These sensors do not normally receive signals generated by a user but may still serve as media sources. An output device is used to produce data, such as a speaker to produce auditory signals, a monitor to produce visual signals, or a heater to produce heat. An integrated device integrates input features and output features and typically includes a camera, a microphone, a screen, and a speaker. Example of an integrated device include a desktop computer, laptop computer, tablet computer, smartphone, or wearable device. A media switch typically comprises a plurality of ports into which media devices can be plugged. The media switch is configured to then re-direct data communicated by media sources to output channels, thus "turning on" or "activating" connections with specific output devices in accordance with instructions from the server 102. In general, one or more of the input devices can be selected to capture participant actions in addition to or instead of other activities in the physical room. The selected input devices can be dedicated to such use or can concurrently capture other activities in the physical room. For example, the microphone capturing spoken words from a participant can be connected with a speaker to broadcast the spoken words, and the microphone can also capture other sounds made in the physical room.

In this example, the media switch 124 can comprise many ports for connecting multiple media and I/O devices. The media switch 124 can support a standard interface for media transmission, such as HDMI. The media devices 122 and 126 communicating with the media switch 124 can be video sources. The server 102 can serve as an intermediary media source to the media switch 124 by converting data received from certain input devices to a format compatible with the communication interface supported by the media switch 124. The media devices 128 and 130 communicating with the media switch 124 can include a digital audio device or a video projector, which may be similar to other output devices but being specifically compatible with the communication interface supported by the media switch 124. The additional input devices 114 and 116 can be a microphone and a camera. The integrated devices 132 and 120 can be a laptop computer and a mobile phone. The server 102 and the components of the I/O system can be specifically arranged in the physical room to maximize the communication efficiency and overall performance.

The networks 118 may be implemented by any medium or mechanism that provides for the exchange of data between the various elements of FIG. 1. Examples of networks 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, the server 102 is programmed to receive tracked action data associated with one or more users from one or more computer devices, which could include one of the integrated devices 120 or 132. The tracking of actions and generation of tracked action data can involve receiving data regarding what is happening in the physical room by an input device, and identifying and interpreting a command issued by a participant in the physical room from the data by a computing device coupled to the input device. The identification and interpretation of a command performed via physical interaction with an input device, such as a keyboard or a touchpad, for example, could be straightforward. The identification and interpretation of a command in general can be performed using existing techniques known to someone skilled in the art, such as the one described in U.S. Pat. No. 10,838,881.

In some embodiments, the server 102 is programmed to process the tracked actions associated with one or more users to identify compound actions that correspond to sequences of actions performed by a user. The server 102 is further programmed to generate instructions which, when executed by a computing device, cause an output device coupled to the computing device to present deep links each representing a compound action and usable by the user to execute the compound action in one step.

In some embodiments, the server 102 is programmed to receive invocation data indicating an invocation of a deep link from an input device or an integrated device. The server is further programmed to cause performance of the corresponding compound action, which corresponds to a sequence of actions. For example, the server 102 can send instructions for performing an action of the sequence of actions to any device required to perform the action. When the sequence of actions can all be performed by the input device or a coupled integrated device or output device, sending any invocation data to the server 102 can be optional.

3. Example Computer Components

Figure 2:
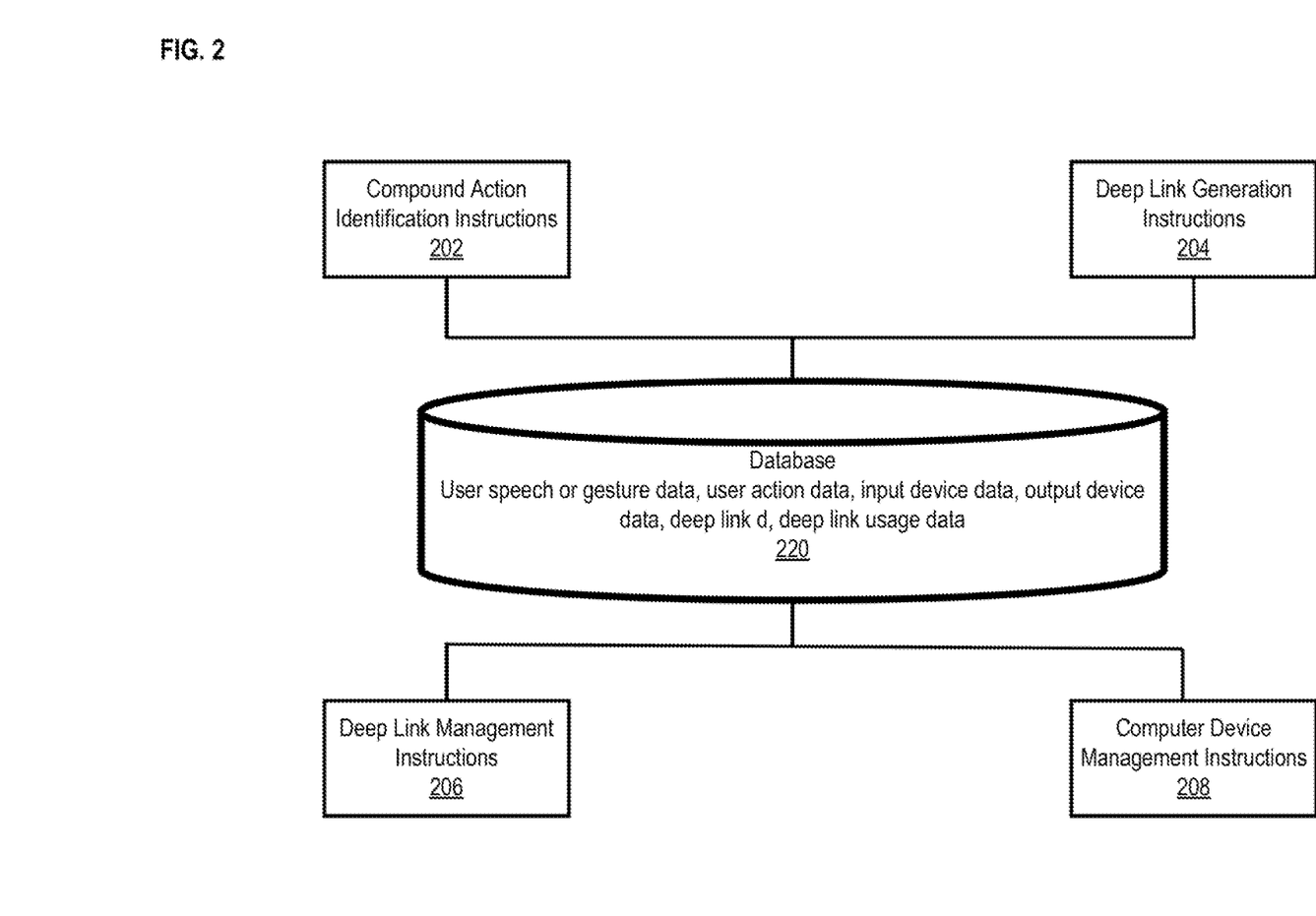
FIG. 2 illustrates example computer components of a device management server computer in accordance with the disclosed embodiments.

FIG. 2 illustrates example components of the device management server in accordance with the disclosed embodiments. This figure is for illustration purposes only and the server 102 can comprise fewer or more functional or storage components. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically. A part or an entirety of a component could also be implemented by a client device, such as an integrated device.

In some embodiments, the server 102 can comprise compound action identification instructions 202, deep link generation instructions 204, deep link management instructions 206, and computer device management instructions 208. In addition, the server 102 can comprise a database 220.

In some embodiments, the compound action identification instructions 202 enable identification of compound actions. The identification can comprise analyzing tracked action data and selecting appropriate sequences of actions intended by one user or commonly performed by multiple users for establishing compound actions. A compound action can include parameters, involve actions performed by one or more I/O devices or computing devices, and is performed sufficiently often by at least one user to merit the generation of a deep link executable by one step for the corresponding sequence of actions to be performed.

In some embodiments, the deep link generation instructions 204 enable creating an UI element, such as an icon or a tile, that can be sent to an output device for display. A deep link can refer to the UI element or the instructions to be executed when the UI element is invoked. The UI element may indicate multiple modes of invocation, such as clicking on the UI element or uttering the text indicated in the UI element. The deep link generation instructions 204 also enable generating a voice command as a representation of a deep link. The generation can comprise analyzing context data representing what is happening or often happens in the physical room, such as what is displayed on a screen or which actions were recently performed, and selecting a voice command that effectively represents the compound action corresponding to the deep link while maximizing the likelihood of the voice command being audibly recognized instead of being confused with an irrelevant utterance.

In some embodiments, the deep link management instructions 206 enable tracking usage of deep links and determining how to present UI elements representing deep links in a graphical user interface (GUI) and update such presentation. Such determination may depend on the size or shape of each UI element relative to the size or shape of the GUI, for example. The deep link management instructions 206 also enable determining when to suggest using deep links. Such determination may depend on the current context or preferences of one or more users, for example.

In some embodiments, the computer device management instructions 208 enable management of and communication with various input devices, output devices, integrated devices, media devices, or media switches. The management may include turning on or shutting off an I/O device, adjusting the sensitivity of an input device, adjusting the intensity of an output device, or connecting multiple input and/or output devices (which may include integrate devices or media devices herein). The communication can include receiving data regarding what is happening in the physical room, such as tracked action data, and conveying the process or result of analyzing the received data, such as UI elements representing deep links, back to the physical room.

In some embodiments, the database 220 is programmed or configured to manage relevant data structures and store relevant data for functions performed by the server 102. The relevant data may include data related to the physical room, participants, activities, I/O system components, compound actions, deep links, data processing models or tools, and so on. The data processing models can comprise instructions for selecting a sequence of actions based on a series of commands issued by a user, establishing a compound action that corresponds to a subsequence of the sequence, or determining a voice command to represent a deep link corresponding to the compound action.

4. Functional Descriptions
4.1. Functional Overview

In some embodiments, the server is programmed or configured with data structures and/or database records that are arranged to perform various tasks as described herein. The server receives tracked action data from one or more computer devices. Using the tracked action data, the server identifies sequences of actions for generating compound actions. Selectable deep links or shortcuts for the compound actions are sent to output devices or specific client devices. When the shortcuts are selected, the client device or the server causes performance of the sequence of actions defined by the compound action.

In some embodiments, user commands are received by input devices and translated into digital actions, which are then recorded. The translation and recording can be performed by a processor coupled to the input device, another processor, or the server. The translation can be verified by a user before the determined digital action is recorded. Data regarding the recorded or tracked actions are then transmitted to the server. For example, a user command could be a user typing a keyword into a search bar of a browser, which can be translated into an action by simulating the user action or by directly submitting a search request using an application user interface (API) provided by the search engine. A user command could be a user gesturing waking up a computer. The digital command could be simulating a user touch on the computer keyboard or directly submitting a digital request to the computer to exit the sleep state.

Figure 3:
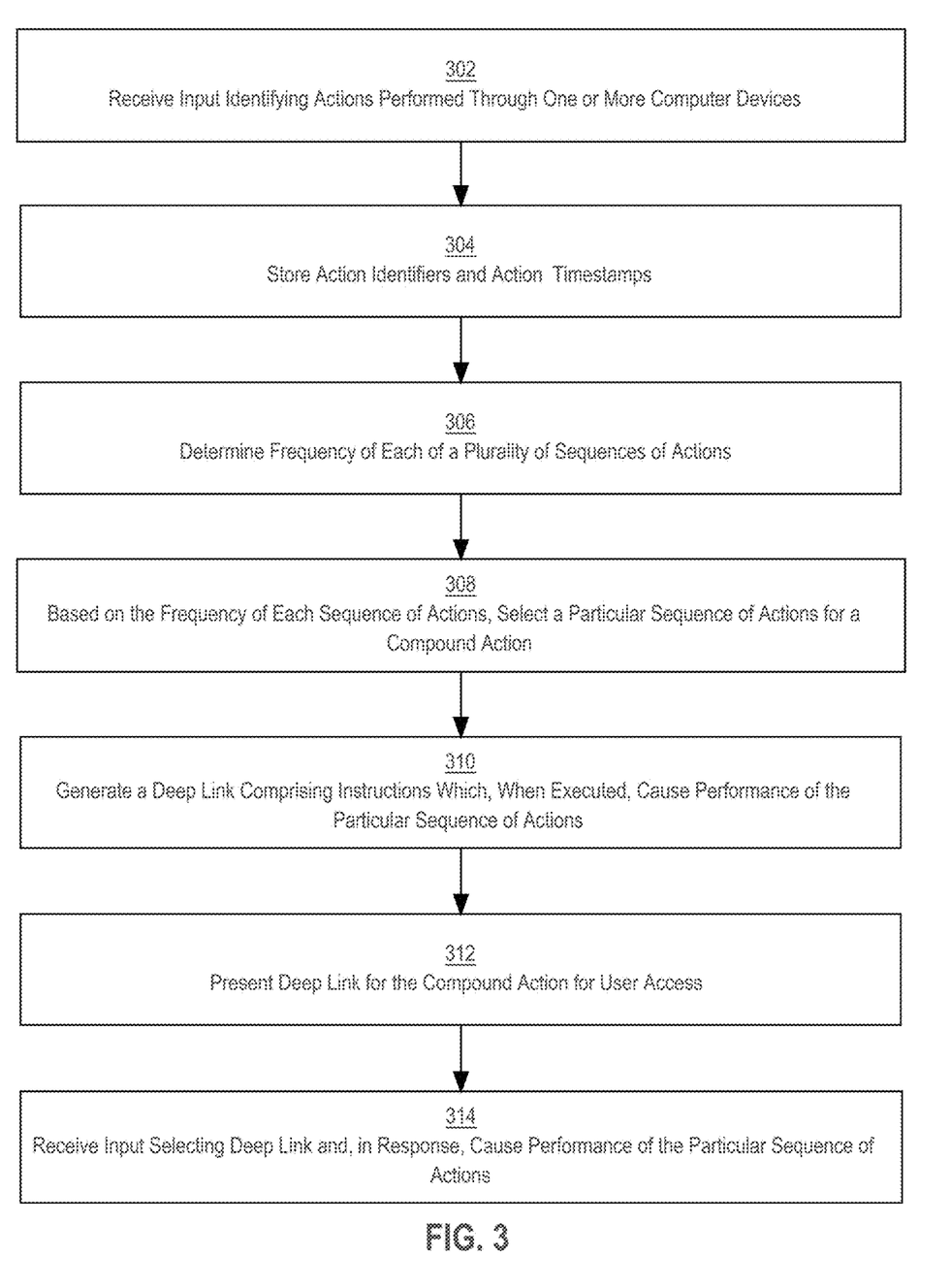
FIG. 3 depicts an example process of automatically tracking actions performed on one or more computer devices and generating compound actions.

FIG. 3 depicts an example process of automatically tracking actions performed on one or more computer devices and generating compound actions. FIG. 3 and the other flow diagrams used herein are intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

At step 302, input identifying actions performed through one or more computer devices is received. For example, one or more client devices may store an action record identifying an action that is performed, a timestamp corresponding to performance of the action, a device identifier identifying the device performing the action, or a user identifier identifying the user issuing a command that leads to the action. Example actions and action identifiers are described further herein.

The one or more client devices may send the stored action records to a server. The one or more client devices may send the action records periodically and/or as the records are created. In an embodiment, the one or more client devices send groups of records when one or more criteria has been met, such as a frequency grouping has been created using the methods described herein.

At step 304, action identifiers and action timestamps are stored. For example, the server may store action identifiers and timestamps in an action data repository. The server may further store a device identifier identifying the device performing the action with the action identifier and timestamp identifier, which may be different from the computer device transmitting the action data to the server.

At step 306, the frequency of each of a plurality of sequences of actions is determined. For example, the server may identify a plurality of sequences of one or more actions of different lengths. A length of a sequence, as used herein, refers to a number of different actions performed in the sequence. The server can identify subsequences from the sequence. For example, when three actions, $A_1$, $A_2$, and $A_3$, are performed in that order, the server may identify up to six subsequences: $\{A_1\}$, $\{A_2\}$, $\{A_3\}$, $\{A_1, A_2\}$, $\{A_2, A_3\}$, $\{A_1, A_2, A_3\}$. The frequency may be normalized with respect to other sequences of actions in a particular time window from a particular client device or associated with a particular user and/or other sequences from different time windows, client devices, and/or users. Methods for determining the frequencies of sequences of actions are described further herein.

At step 306, based on the frequency of each sequence of actions, a particular sequence of actions is selected for a compound action. For example, the server may select the sequence of actions with the highest frequency. In an embodiment, the server selects a plurality of sequences of actions. Selecting the plurality of sequences of actions may comprise selecting sequences that maximize the frequency and sequence length while keeping the total number of sequences of actions identified as compound actions less than a threshold number. Methods for selecting sequences of actions for generating compound actions are described further herein.

At step 310, a compound action is identified, and a corresponding deep link is generated. The deep link is associated with instructions which, when executed, cause performance of the particular sequence of actions. For example, when the sequence of actions comprises opening a browser, navigating to a particular webpage, selecting an editable text box, inputting text, and selecting a selectable option, the deep link, when selected, would cause the client device to perform each of the above actions without additional input.

At step 312, a GUI presenting one or more deep links for identified compound actions is generated. The GUI may include an UI element that is displayed on an output device. a deep link may additionally or alternatively be represented as a voice command. Example deep links and methods for generating them are described further herein. The server can send information regarding the deep links to one or more client devices that can then be selected by users for the corresponding compound actions to be performed.

At step 314, input is received selecting a deep link as a shortcut and, in response, the corresponding sequence of actions is performed. For example, a user may select a UI element displayed on the client device and/or may provide a voice command representing the deep link, such as a string of text displayed within the UI element. The client device receiving the selection may forward the selection the server.

In response to receiving the selection of the shortcut, the server may cause one or more computer devices in the multi-modal networked environment to performance of the corresponding sequence of actions.

While steps 302-314 are described as being performed by the server herein to provide a clear example, in an embodiment, steps 302-314 may be performed by a client device through which some of the actions are performed. For example, the client device may track actions performed and send action data to an application executing on the client device. The application may receive the action data, identify sequences of actions, identify particular sequences of as compound actions, and generate deep links corresponding to the compound actions. In some embodiments, parts of the method described above are split between one or more client devices and the server. For example, the server may perform 302-312 and send the instructions to the client device. The client device may then display the GUI, receive the selection of an UI element, and, in response to the selection, cause performance of the corresponding compound action.

4.2. Compound Action Identification

Figure 4:
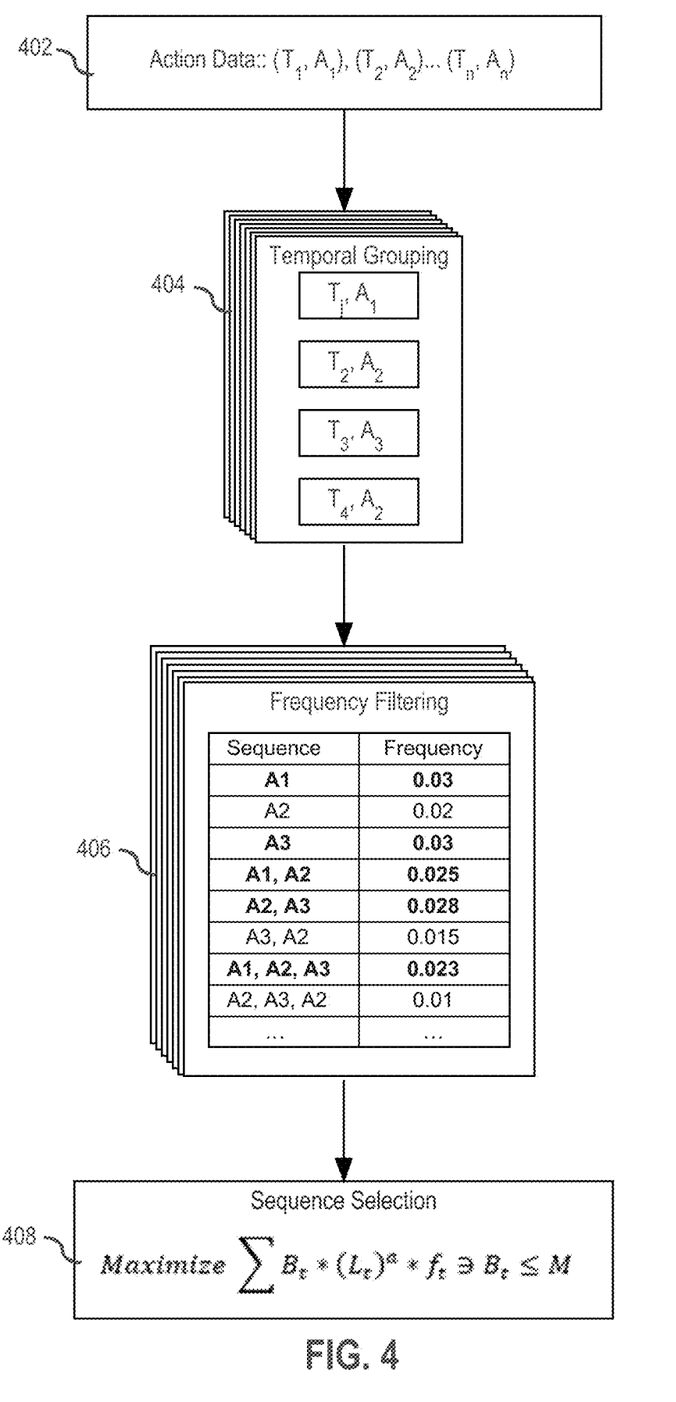
FIG. 4 depicts an example method for generating compound actions.

A compound action, as used herein, refers to a plurality of actions that are performed sequentially. FIG. 4 depicts an example method for identifying compound actions. Action data 402 comprises data identifying a plurality of actions performed by one or more computer devices and associated with one or more users. The actions may be performed through different applications or software programs executing on a computing device, for example. An action, as used herein, refers to an operation of or interaction with a computer device, such as sending data to an input device, turning on an output device, providing input to a graphical user interface managed by a computing device, or executing software instructions on a computing device. For further example, when a user selects an option on a desktop to open an application, the action comprises executing the instructions to open the application by the computing device. Examples of actions include, but are not limited to:

- opening an application;
- opening a new tab in an application, such as a browser;
- entering a web site name in a browser;
- selecting an editable text box, such as a search bar, in an application, such as a browser;
- entering a search string into a search bar;
- selecting a hyperlink;
- selecting a selectable graphical user interface element;
- selecting a particular search result;
- selecting a video to play;
- causing a video to start play;
- selecting a timestamp in a video;
- pausing a video;
- entering full screen in an application, such as a video player;
- exiting full screen in an application;
- selecting a different tab in an application;
- bookmarking a website;
- increasing or decreasing volume; or
- muting a video or song.

In an embodiment, actions may be abstracted to make the actions more general. For example, an action of typing "funny cat pictures" into a search bar may be generalized to entering text in the search bar. Additionally, application-specific actions may be generalized to include counterpart actions performed in other applications. As an example, opening a particular browser may be generalized to opening a default browser. As another example, options in different applications that perform similar functions may be treated as equivalent. The server may store data identifying generalized actions and any application-specific actions that can be replaced with the generalized actions.

In an embodiment, generating a generalized action comprises determining an intent of an action and one or more slots to be filled in for the action when the action is performed. The intent, as used herein, refers to the goal of performing the action. Slots refer to specific information that can be generalized for a plurality of use cases, which could dynamically be determined for each action or set of actions. Typically, the intent is kept in the action, but other portions, such as the filters or subjects/objects related to the intent, could be turned into parameters. Examples slots may include a website address, a selected link on a page, a selected video, search data typed into a search bar, or another input parameter for a computer application. Example slots may also include types or component of I/O devices. Slots may also comprise predetermined parameters, such as an amount volume is raised on an output device or a filter on a search on a computing device. By generalizing the actions, certain actions could be considered equivalent in the identification of compound actions.

The server may identify intents using one or more techniques. For example, the intent may be identified from the final action performed. In the example of a search, the final action may be selecting the search option. The intent could be determined from additional context, such as what is shown by one of the output devices. The intent may also be identified using machine learning techniques, such as statistical parsing which is used to match verbs (intents) with the nouns or objects (slots). Thus, an example compound action may comprise "search for <term> on <website> filtered by <filter>".

Any known method for tracking actions may be used to identify performed actions. In an embodiment, individual devices track actions performed within them and provide the action data to the server through an application programing interface (API). In another embodiment, a tracking application executing on the client device records actions performed with hardware components and sends the action data to the server.

As noted above, the server may store at least two pieces of data for each action of a user: the action or generalized version of the action and a timestamp of the action. The server may additionally store data identifying a computer device that performed the action. The action data may be stored as a series of tuples, such as {A, T, D, U}, where A identifies an action, T indicates the time the action was performed, D identifies computer device performing the action, and U identifies the user issuing a command to perform the action.

4.2.1. Temporal Groupings

Referring again to FIG. 4, the server separates the action data 402 into temporal groupings 404 corresponding to a plurality of time windows. The plurality of time windows may be used to ensure that action sequences do not become attenuated, overly long, or include unrelated actions. The plurality of time windows may also be specific to a client device or a user.

In an embodiment, the time windows are generated based on timestamps for the tracked actions. For example, the server may be configured to determine a difference in time between consecutive actions. If the difference in time exceeds a threshold value, such as five minutes, the server may generate a new time window. Thus, only actions that occur within close temporal proximity to each other may end up being grouped in a time window. The use of temporal thresholds to divide time windows may be used to generate long-term compound actions in that each time window might correspond to a long-term compound action. The original full sequence of actions can also be grouped into long-term compound actions, each corresponding to a sequence of actions covering a relatively long time, by associated timestamps using any clustering technique known to someone skilled in the art. Long-term compound actions comprise compound actions generated from action data received from a plurality of computer devices over an extended period of time.

In an embodiment, moving time windows are generated, thereby encompassing different combinations of actions. For example, a moving time window that is typically smaller than one or more of the time windows determined for long-term compound actions, may be utilized such that all actions that occur within a thirty-minute span are included in the time window, for example. The moving window may be slid across the original long sequence of actions by a certain number of actions at time. The moving time window may be used to generate short-term compound actions. Short-term compound actions comprise compound actions generated from actions performed over a recent period in time, such as within a last thirty minutes.

In some embodiments, the server analyzes a sequence of actions and determines whether any inter-goal optimization can be performed to reduce the usage of computational resources. The server may have preset rules to determine spatial relationships in a GUI or computer applications in the networked environment. As one example, the server may determine that the sequence of actions include multiple tabs of a browser being accessed repeatedly. When the access of multiple tabs is performed by simulating user commands to successively traverse adjacent tabs, the server can add initial actions to the sequence of actions to rearrange the tabs so that tabs to be accessed are located next to one another for quicker access. For further example, the sequence of actions may include accessing tabs 5, 15, 20, 15, 20, and 15, in that order. The server may thus add initial actions to move tabs 5, 15, and 20 to be adjacent, so that they become tabs 1, 2, and 3, for example, and adjust subsequent actions in the sequence of actions to access tab 1, simulate a user action to click on a right arrow to access tab 2, and so on. As another example, the server may determine that the sequence of actions include multiple computer applications that need to be executed independently. The server can rearrange the execution order so that those computer applications that reside on the same device are to be executed before another computer application is executed to save some network communication bandwidth.

4.2.2. Frequency Filtering

In an embodiment, the server identifies a plurality of sequences of actions in each time window. The sequences of actions may comprise any number of actions in the order in which they were performed. Thus, a first sequence of actions may comprise a two actions while a second sequence may comprise five actions. Additionally, or alternatively, a minimum number of actions may be defined for sequence determination. For example, if the minimum number of actions is defined as three actions, then the server may only create action sequences of three actions or longer. The minimum number of frequencies used could vary depending on whether it is long-term compound actions or short-term compound actions that are being considered.

Referring to FIG. 4, the server uses the action sequences generated from the temporal groupings 404 to execute the frequency filter 406. The server initially computes a frequency for each sequence. The computed frequency may comprise a normalized frequency based on a total number of sequences in the temporal grouping and/or a total number of sequences across a plurality of temporal groupings. For example, if a particular sequence of actions occurs five times during a time window which comprises of fifty-five total occurrences of the same or different action sequences, then the frequency of the particular sequence of actions may be computed as five divided by fifty-five, or 0.091.

The server may filter out action sequences that have a frequency that is less than or equal to a threshold value. The threshold value may be a preset value, such as 0.02 or may be computed based on a number of actions or action sequences in the time window. For example, the threshold may be computed as a percent of the total number of action sequences, such as two percent, or as a base number divided by the total number of action sequences. For instance, if the base number is two, then in the previous example the threshold may comprise two divided by fifty-five, or 0.036. A combination of the above techniques may also be used. For example, the threshold may comprise the greater of a preset value or a particular base number divided by the total number of action sequences.

4.2.3. Selection of Sequences of Actions

In an embodiment, the server selects a plurality of action sequences from the filtered sequences generated from the plurality of time windows. For example, each action sequence with a frequency greater than the threshold frequency may be identified as comprising the following values: a sequence length (number of actions in the sequence) and a frequency. Similar to the frequency normalization discussed above in Section 4.2.2, the server can combine action sequences from different time windows or associated with different users. Instances of a particular action sequence across multiple time windows may be aggregated and the total aggregated number of instances of the same particular action sequence may then be divided by the total number of instances of action sequences in the set, thereby providing a single frequency value for the particular action sequence.

The step of aggregating action sequences across a plurality of time windows may include abstracting actions or using generalized actions, as described above. For example, a first sequence may comprise opening a first browser, navigating to a particular website through entering a uniform resource locator (URL), selecting a search bar on the particular website, entering a search for "kitten pictures" and selecting the search option. Meanwhile, a second sequence may comprise opening a second browser, navigating to the particular website through a selectable option on a home page of the second browser, selecting the search bar, entering a search for "party clowns" and selecting the search option. Both sequences may be abstracted to opening a browser application, navigating to the particular website, selecting the search bar, entering search text, and selecting the search option. Thus, despite the sequences of actions being performed through different applications and including different searches, the action sequences may be aggregated together due to the performance of the same function, but through slightly different means.

Referring to FIG. 4, the server uses the action sequences that are output from the frequency filtering 406, i.e., the sequences that have greater than a threshold normalized frequency value, to optimize the selection of the sequences of actions 408 for identifying a compound action. The optimization may comprise maximizing the length of the selected sequences of actions and the frequency of the sequences of actions while limiting the total number of sequences of actions selected. In this manner, only a certain number of sequences may be selected based on the sequences being highly repeated and/or comprising a large length of interrelated actions. As action sequences below a threshold frequency were filtered out in a previous step, the longest action sequences selected may still comprise action sequences that were repeated one or more times. An example equation for selecting the sequences of actions is provided below:

$$\text{Maximize} \Sigma B_t * (L_t)^a * f_t, \Sigma B_t \leq M$$

where $B_t$ is a Boolean parameter which equals 1 for when a sequence t is selected and 0 when the sequence t is not selected, $L_t$ is the number of actions in the sequence, $f_t$ is the (normalized) frequency of the sequence, a is a preset parameter which is greater than one and used to increase the preference for longer sequences, and M is a threshold maximum number of sequences. The parameter, a, may be a static parameter, such as 2, or may be a user selected parameter depending on an implementation.

By the maximization above with the constraint that $\Sigma B_t \leq M$, the server is able to select a relatively small number of action sequences that balance frequency of use with number of sequences for compound actions. A deep link can be created for each sequence of actions t for which $B_t=1$. M could be determined based on the amount of space available on a certain screen, the size of the graphical representation of each deep link to be displayed on the screen, a certain number of compound actions that typically users may remember, any user preference, or any other factor. This optimization ensures that the action combinations selected are those which would be most likely to be repeated in the future and most benefitted from the creation of a corresponding deep link.

4.2.4. Identification of Compound Actions for Deep Links

When one or more action sequences have been selected, the server establishes a compound action. A compound action, as used herein, comprises a plurality of actions that are performed sequentially. Identifying the compound action and generating a corresponding deep link, as further discussed below, may comprise generating instructions which, when executed cause actions a sequence to be performed sequentially. Identifying the compound action leads to generating a deep link as a shortcut for performing the compound action. The shortcut defines one or more inputs which when received cause performance of the sequence of actions. The shortcut may additionally include one or more graphical elements, such as an icon or a displayed hyperlink. Additionally, or alternatively, the shortcut may comprise voice command instructions which are configured based on the instructions noted above to cause performance of the compound action in response to receiving and parsing one or more voice commands.

Compound actions may comprise long-term compound actions and/or short-term compound actions, as discussed above. In an embodiment, shortcuts for the long-term compound actions are generated and provided to client devices based on a default schedule. Shortcuts for short-term compound actions may be generated in real-time as actions are performed using the sliding time window, such as the thirty-minute time window described above. The server may filter and optimize short-term compound actions using the methods described herein. Specifically, the server can select subsequences from sequences identified using the method described in Section 4.2.3. and generate links for those subsequences instead of the original identified sequences. This selection could be performed using data across users to generate subsequences from long-term sequences of actions, but data for each user to generate subsequences from short-term sequences of actions. For a given sequence identified using the method described in Section 4.2.3, frequencies of all possible subsequences could be calculated use by a filter before the subsequences are considered for selection.

In some embodiments, when a compound action is repeated more than a threshold number of times, such as three times, a currently presented deep link may be replaced with the deep link representing the compound action. Selecting a compound action to replace may comprise selecting the compound action that has been used the least generally over time, the compound action that has been used the least by a client device or a user, the compound action with the lowest normalized frequency, or the compound action with the lowest value of $(L_t)^a * f_t$.

5. Compound Action Interfaces

In an embodiment, an output device standing alone or as part of an integrated device displays a GUI depicting the deep links as shortcuts generated by the server. The GUI may be displayed in response to executing an application provided by the server. Additionally, or alternatively, the shortcuts may be overlayed on a graphical user interface already displayed by the output device.

In some embodiments, the GUI is only displayed in response to receiving a voice command prompt. For example, the prompt could be "hey Merlyn". The voice command prompt acts as a precursor to the receipt of selection of deep links. Automatically launched or in response to receiving the voice command prompt, an output device may display a GUI which again identifies voice command prompt and/or UI elements with multiple input modes. Additionally, or alternatively, embodiments may be executed with only graphical user interfaces without voice commands or with only voice commands and no graphical user interface. In other embodiments, compound actions can be executed via automatic conditional triggers based on the passage of time or other predetermined events.

In an embodiment, the server identifies both long-term compound actions and short-term compound actions using the methods described above. The long-term compound actions may be identified from actions performed by a plurality of computer devices or initiated by a plurality of users separated into time windows using the methods described herein. The short-term compound actions may be identified from actions of a particular computing device or initiated by each individual user within a moving time window, such as the thirty-minute time window described above. The server may cause presentation of deep links representing both long-term and short-term compound actions through the GUI. In an embodiment, the short-term compound actions are identified as being separate from the long-term compound actions, such as through partitioning or added textual information.

5.1. Example Visual Interfaces

Figure 5:
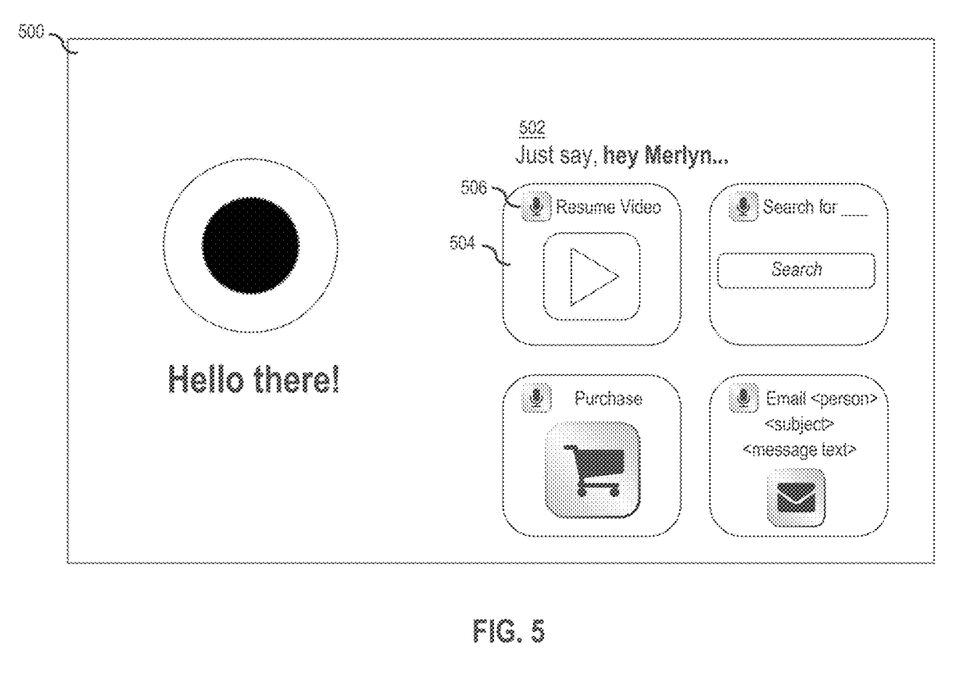
FIG. 5 depicts an example graphical user interface for displaying compound action shortcuts.

FIG. 5 depicts an example graphical user interface for displaying compound action shortcuts. Interface 500 comprises voice command prompt 502 and icons, such as the tile 504. the voice command prompt 502 comprises data identifying a voice command which, when received, can cause an input device to record subsequent audio to activate voice commands corresponding to deep links. The use of a voice command prompt 502 ensures that general audio is not mistaken for one of the shortcut voice commands.

In some embodiments, the tile 504 comprise graphical depictions of a deep link or shortcut representing a specific compound action. The tile 504 may include a selectable button and an indicator 506 of accepting a voice command. The indicator 506 can indicate that an input device is listening to a specific voice command associated with the specific compound action represented by the icon 504, such as a string of text to be uttered displayed in the icon 506 or next to the indicator 506 (e.g., "Resume Video"). Similar to a selection of the icon 504, an utterance of the specific voice command would cause execution of the specific compound action. In certain embodiments, the indicator 504 is to be separately selected before the listening for the specific voice command begins. In other embodiments, the interface 500 might be automatically launched, and a client device might be ready to listen to the voice commands corresponding to the deep links shown in the interface 500 or even additional saved voice commands. In that case, saying the voice command prompt 502 or clicking on the microphone button 506 could be skipped.

In some embodiments, the selectable button comprises an option which, when selected through the GUI, causes the system to execute the compound action corresponding to the shortcut. The shortcuts may be generated using images relating to the determined intent of the compound action. For example, compound actions relating to playing a video may lead to a video icon while compound actions relating to sending a message may lead to a mail icon. The shortcuts may additionally or alternatively be generated using images relating to an application through which the command would execute, such as a particular search site icon or a particular application icon.

The GUI may include options for selecting deep links to review, keep, remove, replace, modify, or rearrange. The option for reviewing the deep link, when selected, may cause the GUI to depict each action in the sequence of actions corresponding to the deep link. For example, the list of actions constituting a compound action could be displayed as an overlay or in a separate window upon a mouse-over of the corresponding deep link. The option for keeping the deep link, when selected, may cause the GUI to lock the deep link in place such that the deep link is not replaced by subsequently identified deep links without receiving user input. The option for removing the deep link, when selected, may cause the shortcut to be removed from the GUI. In an embodiment, a removed deep link can be replaced with a newly generated deep link representing a newly identified compound action, such as through execution of the optimization method described herein. A deep link that was created before but not currently displayed could also be redisplayed when the deep link satisfies certain conditions, such as being used via voice commands repeatedly during a recent period of time, or a repeated selection from a full list of deep links. The option for modifying the deep link, when selected, may cause the GUI to display options for removing actions from the sequence of actions, change actions in the sequence of actions, change an ordering of actions in the sequence of actions, and/or add additional actions to the sequence of actions. The option for modifying the compound action may additionally include options for changing an icon or voice command for the compound action.

In some embodiments, as the size or shape of GUI for deep links is adjusted, the server can automatically adjust the number, sizes, or arrangement of the representation of deep links. In general, the placement of the tiles, for example, could reflect a user preference or usage pattern. For example, the deep links that are used more frequently can be located in more prominent areas, a user preferred area, or shown in a more prominent ways, such as in a bigger size or with a highlighting effect. As the size of the GUI becomes smaller, for example, one or more tiles that are used less frequently can be removed from the GUI, and the continuous identification of compound actions can be subject to a smaller number of maximum compound actions. Alternatively, each tile can shrink in size. The removed tiles or other UI elements for deep links could still remain accessible through menu actions or stay on a list that is somehow accessible to the user.

In some embodiments, the server determines when to suggest a deep link to a user based on the current state of the computer devices in the physical room, the user's prior command history, what is popular among a user community, or other factors. For example, when the server (or a client device) detects that user issues a command that leads to the performance of the first action in a compound action or an action related to the first action, the server could cause the presentation of an alert that a deep link is available for use to save user effort or computational resources. For further example, the server might receive information that for today's class, the teacher is going to show a presentation. The server might automatically cause a presentation of the GUI where the deep links are represented. The server can also highlight the tile corresponding to the compound action of showing the presentation stored on a laptop but displayed on a projector in full screen discussed above, or transmit an email alert to the user's handheld device or a voice alert to a speaker that the tile or a voice command representing the deep link can be used.

5.2. Voice Command Optimization

Figure 6:
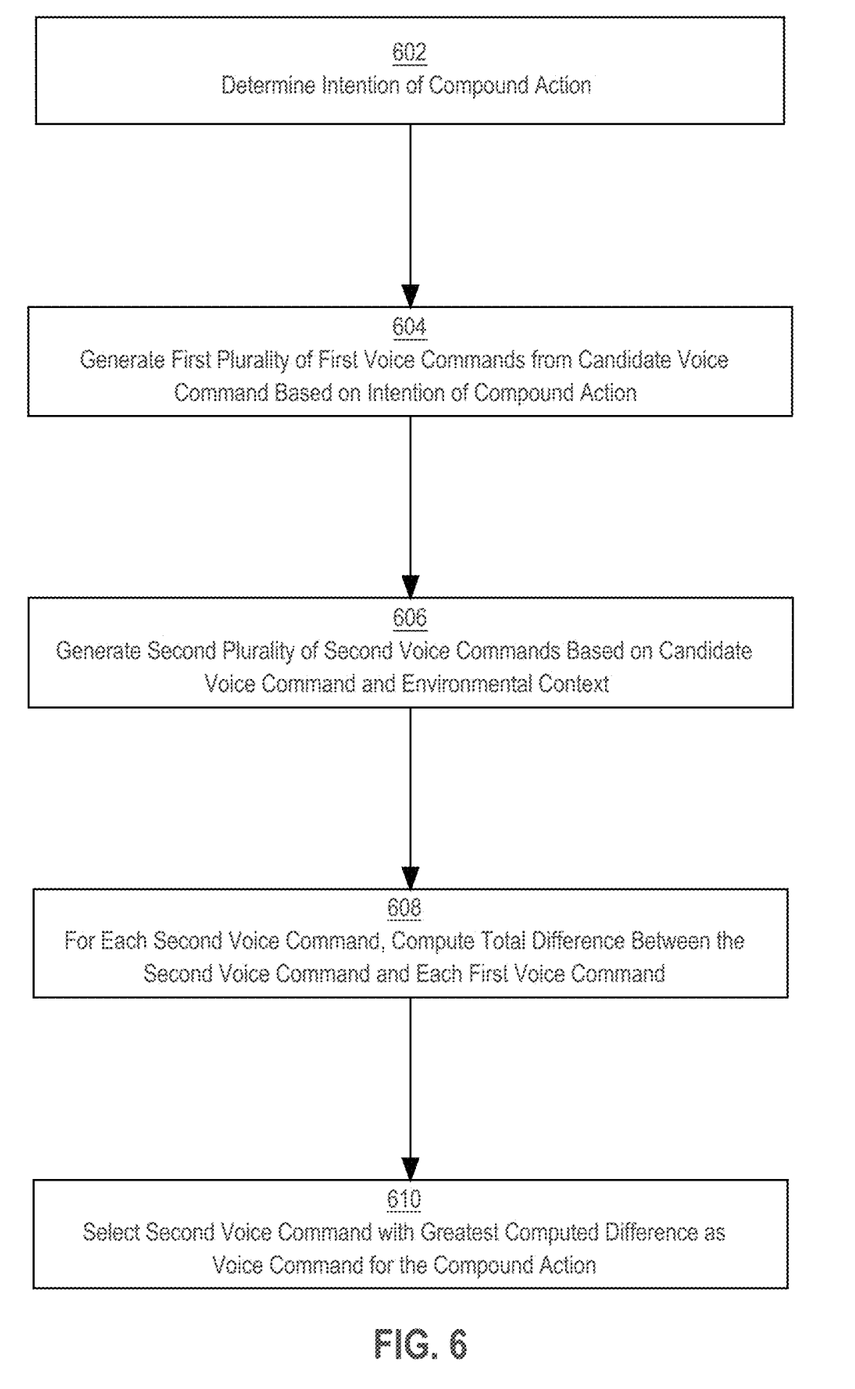
FIG. 6 depicts an example process of generating a voice command for a compound action.

Voice commands may be user-configured or generated by the server. The voice commands may be selected in a manner to reduce confusion between similar sounding commands. FIG. 6 depicts an example process of generating a voice command for a compound action.

At step 602, an intention of the compound action is determined. For example, the intention may be determined using machine learning, such as statistical parsing and/or based on an ultimate or penultimate action performed in the sequence of commands. The server may store data identifying a plurality of types of actions and corresponding intents. For example, if the final action is to begin playing a paused video, the corresponding intent may comprise "resume video". It is noted again that the action is the instructions performed by a computer device as opposed to a command received from a user which causes performance of the action. Thus, while the command may comprise merely selecting a play button, the action would comprise the result of selecting the play the button, namely playing the video.

At step 604, a candidate voice command is generated based on the intention. For example, the server may store data identifying a plurality of candidate voice commands and/or candidate voice command elements. The server may store data associating candidate voice commands and/or candidate voice command elements with actions and/or action intents. Candidate voice command elements may include disparate elements that can be combined into a voice command, such as an identifier of a search filter or search type. In other embodiment, the server can determine a candidate voice command based on different attributes of the compound action, such as one or more keywords identifying the computer devices involved or operations performed in one or more actions constituting the compound action. The server can also request a candidate voice command for a compound action from the user. Then, the server can generate a first plurality of first voice commands that correspond to the compound action's intent or main or final action, such as an Internet search.

At step 606, a second plurality of second voice commands is generated based on the candidate voice command. For example, the server may store, for each voice command, a plurality of alternative versions. For instance, the term "search" may have alternative versions of "find", "lookup", or "query". The server may generate alternative candidate voice commands by replacing portions of the candidate voice command with alternatives, replacing the whole voice command with alternatives, and/or rearranging the ordering of terms. For example, alternatives for "search <webpage> for <topic>" may include "lookup <topic> on <webpage>" or "query on <webpage> for <topic>". The server can also take other factors into consideration, such as the state of the physical room. Such generation of alternative candidate commands or second voice commands can be performing using existing techniques known to someone skilled in the art. In addition, when certain words or phrases are displayed on a screen, being broadcast by a speaker, or are names of certain objects that exist in the physical room, it is also preferable to distinguish a voice command for the compound action of interest from those words or phrases. As the state of the physical room changes, the second voice commands can be updated accordingly.

At step 608, for each generated voice command, a total difference between a first voice command and each second voice command is computed. For example, the server may generate a phonemic transcription of each relevant voice command. A phonemic transcription for a voice command can be obtained and encoded using existing known to someone skilled in the art, such as using the Mitchell and Delbridge symbols. The encodings of two phonemic transcriptions can then be compared using any distance or similarity measure.

In some embodiments, the server may compute:

$$\max_T \sum_{\tau \in TS} |P(T) - P(\tau)| \text{ such that } T \in \text{par}(G) \text{ and } len(T) \leq L$$

where par(G) denotes the second plurality of second voice commands, namely the set of paraphrases for the same goal G (such as the paraphrases for "Search <webpage> for <topic>", TS denotes the first plurality of first voice command, namely the set of commands for the same intention or goal, P(T) denotes the phonemic transcription of the a second voice command T, P($\tau$) is the phonemic transcription of a first voice command $\tau$, and L is a design parameter representing the maximum length of a voice command. L can be set to 10 or 20, for example.

At step 610, a second voice command with the greatest computed difference is identified and selected as the voice command for the compound action. For example, the server may select the second voice command that maximizes the above equation. In an embodiment, the server limits the candidate voice commands by selecting a maximum voice command length. Thus, voice commands with a length greater than a defined threshold value may not be included.

6. Hardware Implementation

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
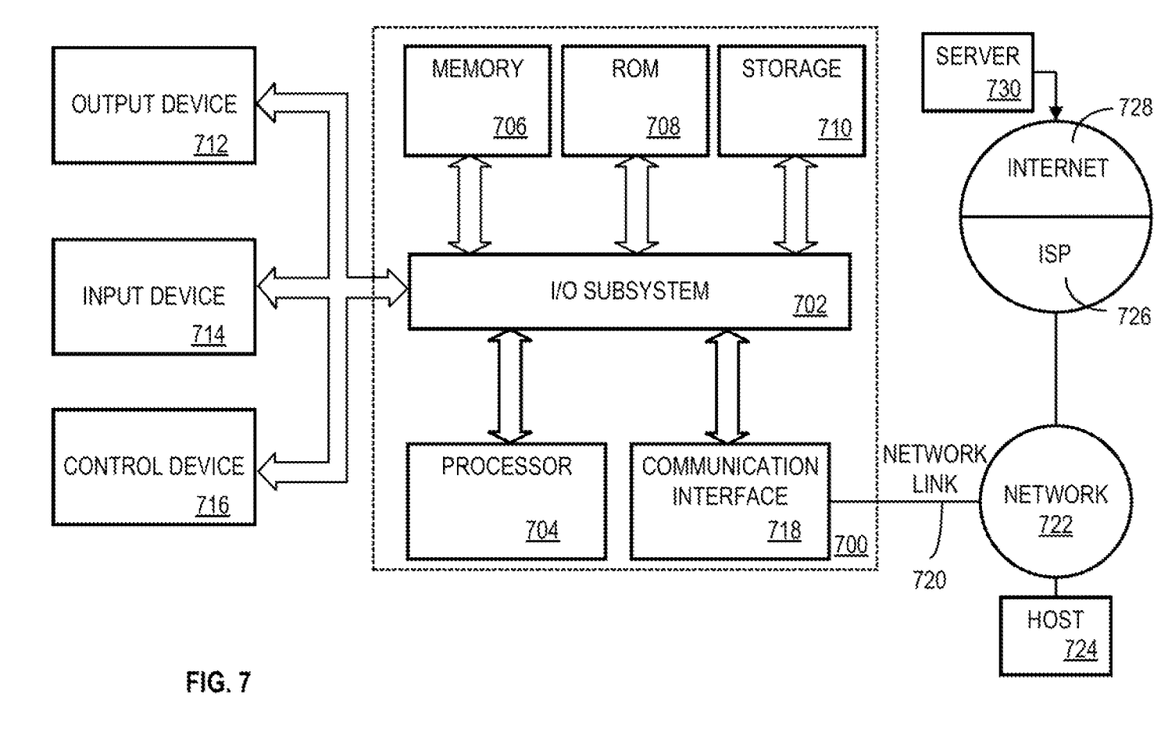
FIG. 7 is a block diagram that illustrates a computer system upon which an embodiment may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general-purpose microprocessor.

Computer system 700 also includes a main memory 706, such as a random-access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 706 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 716 coupled to bus 702. Communication interface 716 provides a two-way data communication coupling to a network link 720 that is connected to a local network 722. For example, communication interface 716 may be an integrated services digital network (ISDN) card, cable modem, satellite modem, or a modem to provide a data communication connection to a corresponding type of telephone line. As another example, communication interface 716 may be a local area network (LAN) card to provide a data communication connection to a compatible LAN. Wireless links may also be implemented. In any such implementation, communication interface 716 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 726. Local network 722 and Internet 726 both use electrical, electromagnetic, or optical signals that carry digital data streams. The signals through the various networks and the signals on network link 720 and through communication interface 716, which carry the digital data to and from computer system 700, are example forms of transmission media.

Computer system 700 can send messages and receive data, including program code, through the network(s), network link 720 and communication interface 716. In the Internet example, a server 730 might transmit a requested code for an application program through Internet 726, ISP 726, local network 722 and communication interface 716.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of improving user operation with multiple computer devices, comprising:
   receiving tracked action data from a plurality of computer devices, including at least one input device and at least one output device;
   selecting, by a processor, one or more sequences of digital actions ("actions") as one or more compound actions from a list of sequences of actions extracted from the tracked action data,
      the one sequence of the one or more sequences of actions being performed by multiple computer devices of the plurality of computer devices and including an action corresponding to a user interaction with an input device of the at least one input device or an output device of the at least one output device,
      the one or more sequences of actions satisfying a set of criteria related to a frequency of occurrence of a sequence of actions and a number of actions in a sequence of actions;
   creating, by the processor, a deep link as a shortcut representing a specific compound action corresponding to a specific sequence of actions of the one or more sequences of actions,
      the specific compound action leading to a specific result, including performance of an input operation by a specific input device of the at least one input device or performance of an output operation by a specific output device of the at least one output device,
      the shortcut when invoked causing performing the specific compound action and producing the specific result via a single gesture or utterance or an automatic conditional trigger;
   causing a presentation of the shortcut via a certain output device of the at least one output device.

2. The computer-implemented method of claim 1, further comprising:
   receiving a selection of the shortcut;
   automatically causing performing the specific sequence of actions and producing the specific result via the single gesture or utterance.

3. The computer-implemented method of claim 1,
the specific sequence of actions including operations by certain multiple computer devices of the plurality of computer devices,
performing the specific sequence of actions comprising transmitting requests to the certain multiple computer devices to carry out the operations.

4. The computer-implemented method of claim 1, the tracked action data including, for each action of a plurality of actions, a device identifier identifying a computer device which performed the action, a timestamp indicating when the action was performed, a user identifier identifying a user who issued a user command to perform the action, or an action identifier identifying the action performed.

5. The computer-implemented method of claim 4, further comprising:
extracting, from the tracked action data, a certain series of actions resulting from user commands issued sequentially by one user;
using the timestamp associated with each action of the certain series of actions, grouping the certain series of actions into a plurality of sequences of actions;
calculating a frequency of occurrence for each of the plurality of sequences of actions as a normalized frequency with respect to other sequences of actions that occur in a common duration.

6. The computer-implemented method of claim 4, further comprising
generating a generalized action associated with one or more users from the tracked action data,
the generalized action incorporating parameters to be given values at run time, which represent a computer device, a computer application, or a parameter of the computer application.

7. The computer-implemented method of claim 1, selecting the one or more sequences of actions comprising finding from the tracked action data no more than a certain number of sequences of actions, each sequence of actions corresponding to a series of commands successively issued by one user, that maximize a total of, for each sequence, a product of a number of actions in the sequence raised to a power related to the number of actions in the sequence and a frequency of occurrence of the sequence.

8. The computer-implemented method of claim 1, the deep link being represented by an UI element in a graphical user interface (GUI) presented by a particular computer device.

9. The computer-implemented method of claim 8, the UI element indicating multiple input modes, including a first mode to accept a physical interaction with the UI element as a selection of the UI element and a second mode to accept a specific utterance as a voice command associated with the specific compound action as a selection of the UI element.

10. The computer-implemented method of claim 8, the selecting comprising determining a threshold on how many sequences of actions are selected from the list of sequences of actions as compound actions based on a shape or size of the GUI and a shape or size of the UI element.

11. The computer-implemented method of claim 8, further comprising replacing the UI element with a second UI element representing a second deep link associated with a second compound action in the GUI based on a frequency of invocation of the second deep link by one or more users during a recent period of time.

12. The computer-implemented method of claim 1, further comprising transmitting an alert to a device associated with a user regarding a specific deep link in response to a notification that a first action in the specific compound action or a second action related to the first action is being performed based on a command by the user or another user designated by the user.

13. The computer-implemented method of claim 1,
the deep link being represented by a specific voice command as a string of text to be spoken,
the creating comprising:
generating a candidate voice command for the specific compound action;
generating a first plurality of voice commands based on a goal of the specific compound action associated with a result of the specific compound action;
generating a second plurality of voice commands based on synonyms of words in the candidate voice command or related to a state of the plurality of computer devices;
finding the specific voice command as a second voice command in the second plurality of voice commands that maximizes a sum of each difference between a phonetic transcription of the second voice command and a phonetic transcription of each first voice command in the first plurality of voice commands.

14. One or more non-transitory storage media storing instructions which, when executed by one or more computing devices, cause performance of a method of improving user operation with multiple computer devices, the method comprising:
receiving a selection of a deep link as a shortcut corresponding to a specific compound action comprising a specific sequence of digital actions ("actions"),
the specific sequence of actions being performed by a plurality of computer devices, including at least one input device or at least one output device,
the specific compound action leading to a specific result, including performance of an input operation by a specific input device of the plurality of computer devices or performance of an output operation by a specific output device of the plurality of computer devices,
the specific sequence of actions satisfying a set of criteria related to a frequency of occurrence of a sequence of actions and a number of actions in a sequence of actions based on tracked action data received from the plurality of computer devices,
the deep link, when invoked via a single gesture or utterance by a user or an automatic trigger, causing performing the specific compound action and producing the specific result,
causing performance of the specific sequence of actions via a certain output device of the at least one output device.

15. The one or more non-transitory storage media of claim 14, the causing comprising send an instruction to a server to transmit requests to the plurality of computer devices to perform the specific sequence of actions.

16. The one or more non-transitory storage media of claim 14, the method further comprising:
generating and storing action data, including, for each action of a plurality of actions, a device identifier identifying a device which performed the action, a timestamp indicating when the action was performed, a user identifier identifying a user who issued a user command to perform the action, or an action identifier identifying the action performed;
transmitting the action data to a server.

17. The one or more non-transitory storage media of claim 14, the method further comprising
   causing the deep link to be represented by an UI element in a graphical user interface (GUI),
   the UI element indicating multiple input modes, including a first mode to accept a physical interaction with the UI element as a selection of the UI elements and a second mode to accept a specific utterance as a voice command associated with the specific compound action as a selection of the UI element.

18. The one or more non-transitory storage media of claim 17, the method further updating a size or shape of the UI element when a shape or size of the GUI changes or a total number of UI elements shown via the GUI changes.

19. The one or more non-transitory storage media of claim 17, further comprising replacing the UI element with a second UI element representing a second deep link associated with a second compound action in the GUI based on a number of invocations of the second deep link by one or more users during a recent period of time.

20. The one or more non-transitory storage media of claim 14, further comprising transmitting an alert to a device associated with a user regarding a deep link in response to a notification that a first action in the specific compound action or a second action related to the first action is being performed based on a command by the user or another user designated by the user.

* * * * *

UNITED STATES PATENT AND TRADEMARK OFFICE
CERTIFICATE OF CORRECTION

PATENT NO. : 11,868,789 B2
APPLICATION NO. : 17/537956
DATED : January 9, 2024
INVENTOR(S) : Ravindranath Kokku et al.

Page 1 of 1

It is certified that error appears in the above-identified patent and that said Letters Patent is hereby corrected as shown below:

In the Claims

Column 23, Line 23, Claim 20, between the words "a" and "deep" the following word should be inserted:
--specific--

Signed and Sealed this
Twenty-second Day of October, 2024

Katherine Kelly Vidal
*Director of the United States Patent and Trademark Office*